United States Patent
Yamamoto

(10) Patent No.: US 9,678,402 B2
(45) Date of Patent: Jun. 13, 2017

(54) ELECTROCHROMIC APPARATUS, OPTICAL FILTER, IMAGING APPARATUS, LENS UNIT, WINDOW MEMBER, AND METHOD OF DRIVING AN ELECTROCHROMIC APPARATUS

(71) Applicant: CANON KABUSHIKI KAISHA, Tokyo (JP)

(72) Inventor: Jun Yamamoto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/061,828

(22) Filed: Mar. 4, 2016

(65) Prior Publication Data
US 2016/0266461 A1    Sep. 15, 2016

(30) Foreign Application Priority Data
Mar. 13, 2015   (JP) ................. 2015-050475

(51) Int. Cl.
| *G02F 1/163* | (2006.01) |
| *G02F 1/153* | (2006.01) |
| *G09G 3/38* | (2006.01) |
| *G09G 3/19* | (2006.01) |
| *G02F 1/15* | (2006.01) |

(Continued)

(52) U.S. Cl.
CPC ............ *G02F 1/163* (2013.01); *G02F 1/15* (2013.01); *G09G 3/19* (2013.01); *G09G 3/38* (2013.01); *G02F 1/153* (2013.01); *G02F 1/155* (2013.01); *G02F 2001/1512* (2013.01);

(Continued)

(58) Field of Classification Search
CPC . G02F 1/03; G02F 1/15; G02F 1/1521; G02F 1/153; G02F 1/155; G02F 1/163; G02F 2001/13318; G02F 2001/13324; G02F 2001/1502; G02F 2001/1512; G02F 2001/1515; G02F 2001/1519; G09G 3/16;

(Continued)

(56) References Cited

U.S. PATENT DOCUMENTS

| 8,018,644 B2 * | 9/2011 | Gustavsson | ............. G02F 1/163 359/296 |
| 8,902,486 B1 * | 12/2014 | Chandrasekhar | ....... G02F 1/163 359/239 |

(Continued)

FOREIGN PATENT DOCUMENTS

JP    11-109423    4/1999

OTHER PUBLICATIONS

Yuichi Watanabe, et al., "Solar Energy Materials & Solar Cells", Jun. 7, 2012, pp. 104 and 140 to 145.

*Primary Examiner* — Loha Ben
(74) *Attorney, Agent, or Firm* — Fitzpatrick, Cella, Harper & Scinto

(57) ABSTRACT

An electrochromic apparatus includes an electrochromic element comprising a pair of electrodes and an electrochromic layer disposed between the pair of electrodes; and drive circuits connected to the electrochromic element, the drive circuits including a drive circuit A and a drive circuit B, in which, when no voltage is applied in a pulse width modulation (PWM) drive of the drive circuit A, a resistance value of the drive circuit A is larger than a resistance value of the electrochromic element, and in which when no voltage is applied in a PWM drive of the drive circuit B, the pair of electrodes is short-circuited.

13 Claims, 9 Drawing Sheets

(51) Int. Cl.
*G02F 1/155* (2006.01)
*G09G 3/16* (2006.01)
*G09G 3/20* (2006.01)

(52) U.S. Cl.
CPC ....... *G02F 2001/1515* (2013.01); *G09G 3/16* (2013.01); *G09G 3/2014* (2013.01)

(58) Field of Classification Search
CPC .. G09G 3/19; G09G 3/34; G09G 3/38; G09G 3/2014; G02C 7/101; G04G 9/0047
USPC ....... 359/239, 245, 264, 265, 270, 273, 275; 345/105; 348/294
See application file for complete search history.

(56) References Cited

U.S. PATENT DOCUMENTS

| | | | |
|---|---|---|---|
| 9,081,247 B1 * | 7/2015 | Pradhan | G02F 1/15 |
| 2014/0362430 A1 * | 12/2014 | Yamamoto | G02F 1/163 |
| | | | 359/275 |
| 2016/0033837 A1 * | 2/2016 | Bjornard | G02F 1/153 |
| | | | 359/265 |
| 2016/0041447 A1 * | 2/2016 | Yamamoto | G02F 1/163 |
| | | | 359/275 |
| 2016/0139477 A1 * | 5/2016 | Jack | G09G 3/19 |
| | | | 359/275 |
| 2016/0202590 A1 * | 7/2016 | Ziebarth | B60R 1/088 |
| | | | 359/239 |
| 2016/0306251 A1 * | 10/2016 | Yamamoto | G02F 1/163 |

* cited by examiner

TRANSMITTED LIGHT

US 9,678,402 B2

ELECTROCHROMIC APPARATUS, OPTICAL FILTER, IMAGING APPARATUS, LENS UNIT, WINDOW MEMBER, AND METHOD OF DRIVING AN ELECTROCHROMIC APPARATUS

BACKGROUND OF THE INVENTION

Field of the Invention

The present invention relates to an electrochromic apparatus, an optical filter, an imaging apparatus, a lens unit, a window member, and a method of driving an electrochromic apparatus.

Description of the Related Art

An electrochromic (EC) phenomenon is a phenomenon in which a material is colored or decolored through changes in its light absorption region induced by a reversible electrochemical reaction (oxidation reaction or reduction reaction) caused at the time of application of a voltage. An electrochemically coloring/decoloring element utilizing the EC phenomenon is referred to as "electrochromic (EC) element," and is expected to find applications as a light control element configured to change an optical transmittance.

As the EC element, there have been known an inorganic EC element using a metal oxide such as $WO_3$, and an organic EC element using an organic low-molecular compound such as a viologen, a conductive polymer, and the like. Of those elements, it has been known that the organic EC element, in which a low-molecular organic material is colored/decolored in a solution state, has advantages of a sufficient contrast ratio in a colored state, a high transmittance in a decolored state, and the like. In addition, it has been known that the organic EC element has an advantage in that its color state can be arbitrarily controlled by mixing a plurality of materials having different absorption wavelengths.

In order to use such an organic EC element in an optical filter, there is required a drive method for controlling the optical transmittance arbitrarily. Further, it is also required to prevent a significant change in absorption spectrum of light absorption in the element even at the time of a change in optical transmittance.

As the drive method for controlling the optical transmittance, in Japanese Patent Application Laid-Open No. H11-109423, there is disclosed a pulse width modulation (PWM) drive method involving applying, to an inorganic EC element, a voltage for causing an electrochemical reaction as a pulse and controlling a ratio of a duration of voltage application to one cycle of the pulse (duty ratio).

Further, in "Solar Energy Materials & Solar Cells" 2012, pp. 104 and 140 to 145, there is such a disclosure that an organic EC element formed of a single type of material is operated through PWM drive. The ratio of the duration of voltage application for causing the electrochemical reaction to one cycle of the pulse (duty ratio) is controlled in the same manner as in Japanese Patent Application Laid-Open No. H11-109423. Further, in particular, during a remaining duration of the one cycle of the pulse, the voltage application is paused and the element is put into an open circuit state, which produces an advantage in that the power consumption can be made smaller than that of the drive method of Japanese Patent Application Laid-Open No. H11-109423.

In Japanese Patent Application Laid-Open No. H11-109423 and "Solar Energy Materials & Solar Cells" 2012, pp. 104 and 140 to 145, there is no disclosure of drive in which a transient response of an effective voltage is taken into consideration.

SUMMARY OF THE INVENTION

The present invention has been accomplished in view of the above-mentioned background art, and is directed to providing an electrochromic apparatus capable of performing drive in which transient responsiveness of an effective voltage is taken into consideration.

According to one aspect of the present invention, there is provided an electrochromic apparatus, including: an electrochromic element including a pair of electrodes and an electrochromic layer disposed between the pair of electrodes; and drive circuits connected to the electrochromic element, the drive circuits including a drive circuit A and a drive circuit B, in which when no voltage is applied in PWM drive of the drive circuit A, a resistance value of the drive circuit A is larger than a resistance value of the electrochromic element, and in which when no voltage is applied in PWM drive of the drive circuit B, the pair of electrodes is short-circuited.

Further features of the present invention will become apparent from the following description of exemplary embodiments with reference to the attached drawings.

DESCRIPTION OF THE EMBODIMENTS

According to the present invention, there is provided an electrochromic apparatus, including: an electrochromic element including a pair of electrodes and an electrochromic layer disposed between the pair of electrodes; and drive circuits connected to the electrochromic element, the drive circuits including a drive circuit A and a drive circuit B, in which when no voltage is applied in PWM drive of the drive circuit A, a resistance value of the drive circuit A is larger than a resistance value of the electrochromic element, and in which when no voltage is applied in PWM drive of the drive circuit B, the pair of electrodes is short-circuited.

That is, the above-mentioned electrochromic apparatus is a drive apparatus configured to connect, to the electrochromic element including the pair of electrodes and the electrochromic layer containing an electrochromic material and being sandwiched between the pair of electrodes, during a halt period, in a closed circuit including the element, a resistor in series whose resistance value is larger than that of another resistor to be connected during an application period, and change an absorbance of the element based on a duty ratio that is a ratio of the application period of the drive voltage to one cycle.

When the present invention is applied, drive of the element in which transient response time is taken into consideration can be performed. Herein, the transient response time is defined below. When the constant voltage is applied to an electrochromic element, the voltage between both electrodes of the element is late a little and arrives at the constant voltage. This delay is defined as a product of a capacitance C [F] between the electrodes of the electrochromic element and a solution resistance [R] between the electrodes generally.

Now, the present invention is described in detail with reference to the attached drawings.

<<Method and Apparatus for Driving EC Element>>

Figure 1:
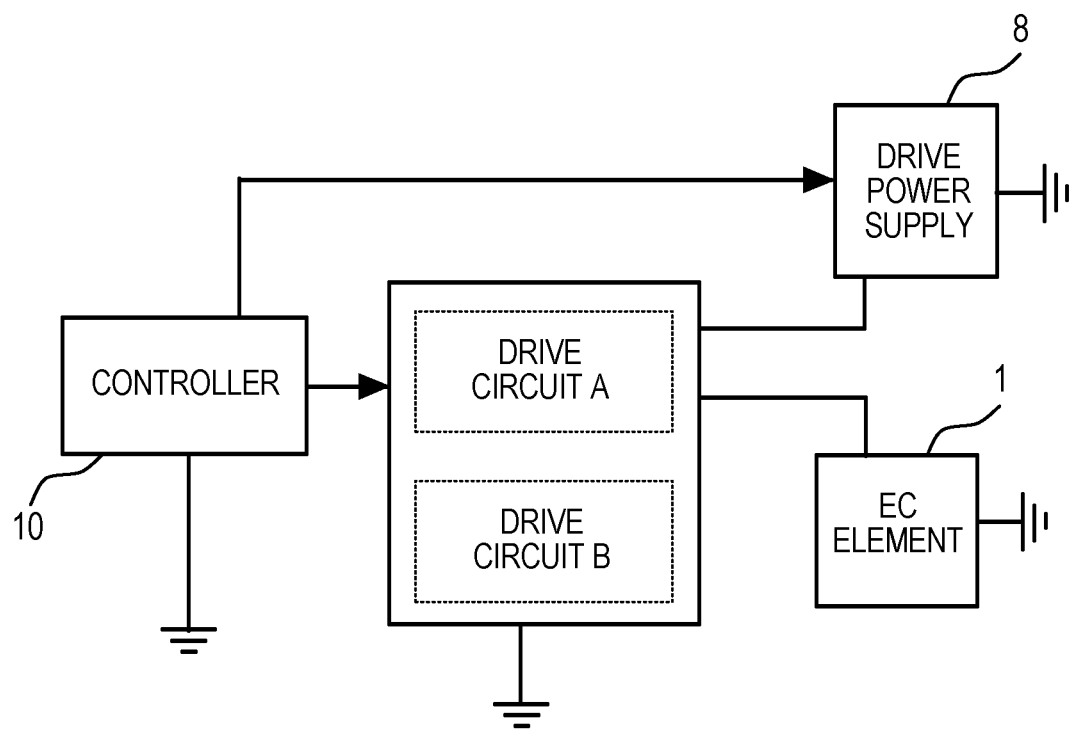
FIG. 1 is a schematic diagram for illustrating an example of an EC apparatus using a drive apparatus according to the present invention.

FIG. 1 is a schematic diagram for illustrating an example of an EC apparatus using a drive apparatus of the present invention. The EC apparatus of FIG. 1 includes an EC element 1 in which an EC layer containing an EC material is sandwiched between a pair of electrodes, and a drive apparatus configured to drive the EC element 1 (a drive power supply 8, a drive circuit A and a drive circuit B, and a controller 10).

(EC Element)

Figure 2:
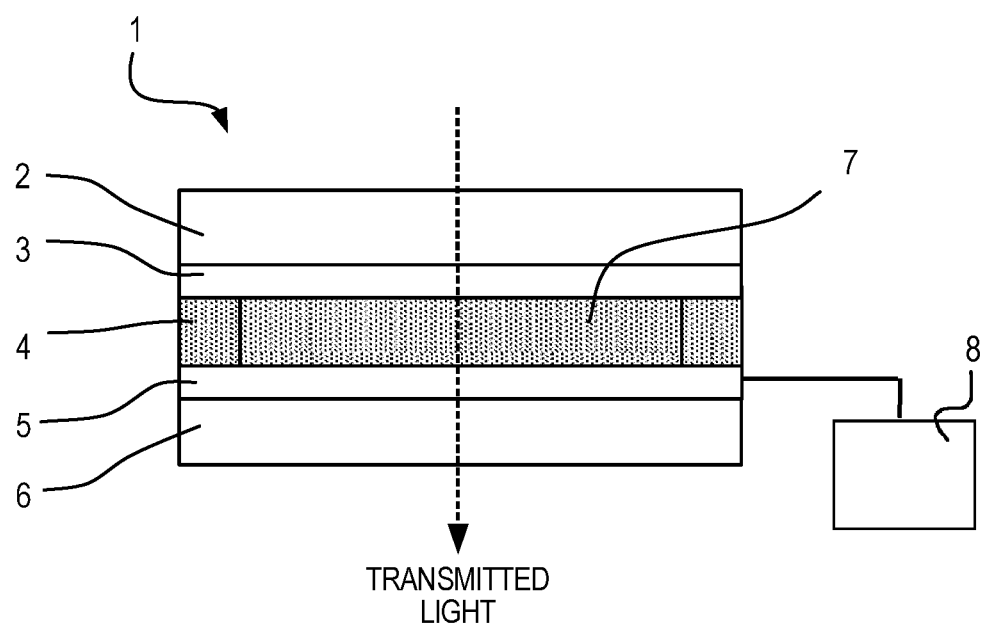
FIG. 2 is a schematic cross-sectional view for illustrating an example of an EC element to be used in the present invention.

FIG. 2 is a schematic cross-sectional view for illustrating an example of an EC element to be used in the present invention. The EC element 1 of FIG. 2 has a configuration in which transparent substrates 2 and 6 having formed thereon transparent electrodes 3 and 5, respectively are bonded to each other through a spacer 4 so that electrode 3 and 5 sides face each other, and an EC layer 7 in which an electrolyte and an organic EC material are dissolved in a solvent is present in a space formed by the pair of electrodes 3 and 5 and the spacer 4. The organic EC material causes an electrochemical reaction when a voltage is applied between the electrodes 3 and 5. Note that, the present invention is preferably applied to an organic EC element, but may be applied to an inorganic EC element using an inorganic EC material.

In general, the organic EC material is in a neutral state under a state in which a voltage is not applied, and does not show absorption in a visible light region. In such decolored state, the organic EC element exhibits a high optical transmittance. When a voltage is applied between the electrodes, the organic EC material causes an electrochemical reaction to be converted from the neutral state to an oxidized state (cation) or a reduced state (anion). The organic EC material shows absorption in the visible light region in the form of cation or anion, to be colored. In such colored state, the organic EC element exhibits a low optical transmittance. In addition, there also exists a material that forms a transparent dication structure in an initial state and is colored in blue through one-electron reduction, like a viologen, which is a typical organic EC material.

In the following discussion, the optical transmittance of the EC element is replaced with the absorbance of the EC element. The transmittance and the absorbance have a relationship of $-\log$ (transmittance)=(absorbance). Every time the transmittance is reduced to $\frac{1}{2}$, the absorbance is increased by about 0.3.

<Substrates 2 and 6>

In the case of using the EC element as a light control element, it is preferred that the EC element keep a high transmittance in a decolored state in order to reduce an influence on an optical system. Therefore, the substrates 2 and 6 are each preferably a transparent substrate configured to sufficiently transmit visible light. A glass material is generally used, and an optical glass substrate such as Corning #7059 or BK-7 may be preferably used. In addition, even a material such as plastic or ceramic may be appropriately used as long as the material has sufficient transparency. The substrates 2 and 6 are each preferably formed of a rigid material with less distortion. In addition, the substrates each more preferably have less flexibility. In general, the substrates 2 and 6 each have a thickness of from several tens of micrometers to several millimeters.

<Electrodes 3 and 5>

In the case of using the EC element as a light control element, it is preferred that the EC element keep a high transmittance in a decolored state in order to reduce an influence on an optical system. Therefore, the electrodes 3 and 5 are each preferably a transparent electrode configured to sufficiently transmit visible light. The electrodes 3 and 5 are each more preferably formed of a material having a high light transmitting property in a visible light region and high conductivity. Examples of such material may include: metals and metal oxides such as indium tin oxide alloy (ITO), tin oxide (NESA), indium zinc oxide (IZO), silver oxide, vanadium oxide, molybdenum oxide, gold, silver, platinum, copper, indium, and chromium; silicon-based materials such as polycrystalline silicon and amorphous silicon; and carbon materials such as carbon black, graphene, graphite, and glassy carbon. In addition, a conductive polymer having its conductivity improved through, for example, doping treatment (such as polyaniline, polypyrrole, polythiophene, polyacetylene, polyparaphenylene, or a complex of polyethylene dioxythiophene and polystyrene sulfonate (PEDOT:PSS)) may also suitably be used. The EC element of the present invention preferably has a high transmittance in a decolored state, and hence, for example, ITO, IZO, NESA, PEDOT:PSS, or graphene is particularly preferably used. These materials may be used in various forms such as a bulk form and a fine particle form. Note that, one of these electrode materials may be used alone, or a plurality thereof may be used in combination.

<EC Layer 7>

The EC layer 7 is preferably an EC layer in which an electrolyte and at least one kind of organic EC material such as a low-molecular organic material are dissolved in a solvent.

The solvent is not particularly limited as long as the solvent can dissolve the electrolyte, but a polar solvent is particularly preferred. Specific examples thereof include water as well as organic polar solvents such as methanol, ethanol, propylene carbonate, ethylene carbonate, dimethyl sulfoxide, dimethoxyethane, acetonitrile, γ-butyrolactone, γ-valerolactone, sulfolane, dimethylformamide, dimethoxyethane, tetrahydrofuran, acetonitrile, propionitrile, dimethylacetamide, methylpyrrolidinone, and dioxolane.

The electrolyte is not particularly limited as long as the electrolyte is an ion dissociative salt exhibiting satisfactory solubility and including a cation or anion having an electron-donating property to the extent that the coloration of the organic EC material can be ensured. Examples thereof include various inorganic ion salts such as alkali metal salts and alkaline earth metal salts, quaternary ammonium salts, and cyclic quaternary ammonium salts. Specific examples thereof include: salts of alkali metals such as Li, Na, and K, e.g., LiClO4, LiSCN, LiBF4, LiAsF6, LiCF3SO3, LiPF6, LiI, NaI, NaSCN, NaClO4, NaBF4, NaAsF6, KSCN, and KCl; and quaternary ammonium salts and cyclic quaternary ammonium salts such as (CH3)4NBF4, (C2H5)4NBF4, (n-C4H9)4NBF4, (C2H5)4NBr, (C2H5)4NClO4, and (n-C4H9)4NClO4. In addition, an ionic liquid may also be used. One of these electrolyte materials may be used alone, or a plurality thereof may be used in combination.

As the organic EC material, any material may be used as long as the material has solubility in the solvent and can express coloration and decoloration through an electrochemical reaction. A known organic EC material to be colored through oxidation/reduction may be used. In addition, a plurality of such materials may be used in combination. That is, the organic EC element according to an embodiment of the present invention may include a plurality of kinds of EC materials.

Regarding the combination of the organic EC material, there may be used one kind or a plurality of kinds of anodic materials each showing coloration through an oxidation reaction, or one kind or a plurality of kinds of cathodic materials each showing coloration through a reduction reaction. In addition, the anodic material and the cathodic material may be used as a combination of one kind each of these materials, a combination of one kind of one of the materials and a plurality of kinds of the other materials, or a combination of a plurality of kinds each of these materials. The combination is arbitrary.

Specific examples of the organic EC material to be used may include: organic dyes such as a viologen dye, a styryl dye, a fluoran dye, a cyanine dye, and an aromatic amine dye; and organometallic complexes such as a metal-bipyridyl complex and a metal-phthalocyanine complex. Note that, the viologen dye can be used as a cathodic material which is decolored in a stable dicationic state with a counter ion, and is colored due to a cationic state through a one-electron reduction reaction. Further, as an anodic organic EC material, not only a compound including an electrochromic site having a thiophene ring, but also a pyrazine-based material, like phenazine, a phenothiazine-based material, a phenoxazine-based material, and an aromatic amine-based material, like triphenylamine may be suitably used.

Of those materials, a compound represented by the following general formula [1] is preferred because generated cations do not cause association with each other. A composition in which a plurality of the compounds each represented by the following general formula [1] are mixed is more preferred.

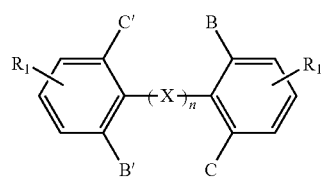

[1]

In the formula, B, B', C, and C' are each independently selected from an alkyl group having 1 or more and 20 or less carbon atoms, an alkoxy group having 1 or more and 20 or less carbon atoms, and an aryl group that may have a substituent. $R_1$ represents a hydrogen atom or a substituent. n represents an integer of from 1 to 5.

Further, X represents a structure represented by the following general formula [2] or [3], and when n represents an integer of 2 or more, X's are each independently selected from the structures represented by the following general formulae [2] and [3].

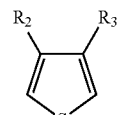

[2]

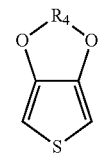

[3]

In the formulae, $R_2$ and $R_3$ are each independently selected from a hydrogen atom, an alkyl group having 1 or more and 20 or less carbon atoms, an alkoxy group having 1 or more and 20 or less carbon atoms, an aryl group that may have a substituent, and an alkyl ester group having 1 or more and 20 or less carbon atoms; and $R_4$ represents an alkylene group having 1 or more and 20 or less carbon atoms.

In addition, when a thiophene ring adjacent to an aromatic ring having the groups B, B', C, and C' in the general formula [1] is represented by the general formula [2], $R_2$ and $R_3$ each represent a substituent other than a hydrogen atom.)

Examples of the substituent that the aryl group represented by any one of B, B', C, and C' may have include an alkyl group having 1 or more and 4 or less carbon atoms and an alkoxy group having 1 or more and 4 or less carbon atoms. In addition, examples of the substituent represented by $R_1$ include a halogen atom, an alkyl group having 1 or more and 20 or less carbon atoms, an alkoxy group having 1 or more and 20 or less carbon atoms, an alkyl ester group having 1 or more and 20 or less carbon atoms, an aryl group that may have a substituent, an amino group that may have a substituent, and a cyano group, and the aryl group and the amino group may each have as a substituent an alkyl group having 1 or more and 4 or less carbon atoms. In addition, examples of the substituent that the aryl group represented by $R_2$ or $R_3$ may have include an alkyl group having 1 or more and 4 or less carbon atoms and an alkoxy group having 1 or more and 4 or less carbon atoms.

Specific examples of the compound represented by the general formula [1] include the following compounds 1 to 3.

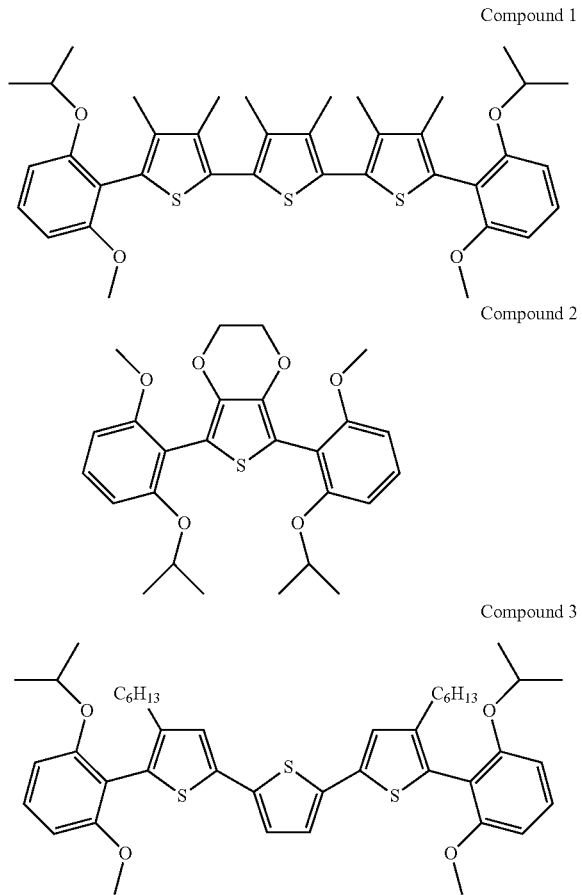

Compound 1

Compound 2

Compound 3

The compound represented by the general formula [1] includes: a portion X exhibiting EC characteristics and having a structure including a thiophene ring; and aromatic rings each having substituents at positions 2 and 6 (B and C, and B' and C') on terminal portions of the structure represented by X. Of thiophene rings in the structure represented by X, a thiophene ring adjacent to each aromatic ring on the terminal portion has at positions 3 and 4 the substituents ($R_2$ and $R_3$) other than a hydrogen atom, such as the alkyl group, or has at these positions the alkylene dioxy group ($R_4$).

The plane of each aromatic ring on the terminal portion is twisted with respect to the plane of the thiophene ring in the structure represented by X through steric hindrance between the substituents of the aromatic ring on the terminal portion and the substituents at positions 3 and 4 of the thiophene ring adjacent to the aromatic ring on the terminal portion. A driving force for causing association is considered to be π-π interaction between a thiophene molecule and another thiophene molecule each exhibiting EC characteristics and forming radical cations. As described above, the aromatic ring on the terminal portion has a molecular structure twisted with respect to the plane of the thiophene ring, and hence the thiophene ring is prevented from being close to another thiophene ring of another organic EC molecule through the steric hindrance with the aromatic ring on the terminal portion and its substituents B and C, or B' and C'. Thus, association is not caused.

The compound represented by the general formula [1] is a material that does not cause association. On the other hand, a material that causes association shows different behavior of absorption change between cations and cations in an associated form at the time of coloring and decoloring. As a result, an absorption spectrum largely changes in some cases. However, the optical transmittance of the compound represented by the general formula [1] can be controlled in both a coloring direction and a decoloring direction while the shape of the absorption spectrum is maintained. Note that, even the material that causes association may be mixed with the compound represented by the general formula [1] when absorption shown by the material in an associated form in itself is not so high as to be visually observed, and does not affect the absorption spectrum.

The EC layer 7 may be an EC layer in which an inorganic EC material is dispersed in a solution. Examples of the inorganic EC material may include tungsten oxide, vanadium oxide, molybdenum oxide, iridium oxide, nickel oxide, manganese oxide, and titanium oxide.

The EC layer 7 is preferably a liquid or a gel. The EC layer 7 is suitably used in a solution state, but may also be used in a gel state. Gelling is carried out by further incorporating a polymer or a gelling agent into a solution. Examples of the polymer (gelling agent) include, but not particularly limited to, polyacrylonitrile, carboxymethylcellulose, polyvinyl chloride, polyvinyl bromide, polyethylene oxide, polypropylene oxide, polyurethane, polyacrylate, polymethacrylate, polyamide, polyacrylamide, polyester, polyvinylidene fluoride, and Nafion. Thus, the EC layer 7 may be used in a viscous state, a gel state, or the like.

In addition, the EC layer may be used in a state in which the solution is supported by a structural body having a transparent and flexible network structure (for example, a sponge-like one), other than in the mixed state as described above.

[Drive Apparatus and Drive Method]

The drive power supply 8 applies a voltage V1, which is required for the EC material of the EC element to cause an electrochemical reaction. When the EC element is formed of a plurality of types of materials as the EC material, it is preferred that V1 be a constant voltage. This is because an absorption spectrum may change due to a difference in oxidation-reduction potential or molar attenuation coefficient among the materials. On the other hand, when the EC element is formed of one type of EC material, the value of V1 may be changed within such a range as to allow a normal electrochemical reaction. The voltage application of the drive power supply 8 is started based on a signal of the controller 10, and a state in which the voltage is applied is maintained based also on a signal of the controller 10. In the present invention, during a period in which the optical transmittance of the EC element is controlled, the state in which the constant voltage is applied is maintained.

As used in the present invention, the "drive voltage" is a voltage for causing at least one of an oxidation reaction and a reduction reaction in the electrochromic material.

The "PWM drive" is a drive method involving applying a continuous drive pulse having the application period and a non-application period (when no voltage is applied) of the drive voltage as one cycle. When no voltage is applied, this means substantially no voltage is applied to the element. Note that, the non-application period may be referred to also as "halt period".

The drive circuit A (drive unit A) includes a resistor switch therein. The resistor switch switches a resistor R1 and a resistor R2, which has a resistance value larger than that of the resistor R1, from one to another, and connects the selected one of the resistors in series to a closed circuit including the drive power supply and the EC element. It is preferred that a resistance value of the resistor R1 be smaller than at least the largest impedance in the element closed circuit, and the resistance value is preferably 10Ω or smaller. It is preferred that the resistance value of the resistor R2 be larger than the largest impedance in the element closed circuit, and the resistance value is preferably 1 MΩ or larger. Further, the resistor R2 may be assumed to be air. In this case, this closed circuit is an open circuit, but when the air is assumed as the resistor R2, this open circuit is equivalent to the closed circuit. Note that, the drive circuit in which the air is assumed as the resistor R2 may be referred to also as "drive circuit A'".

During the application period in which the voltage of the drive power supply is applied to the EC element, the drive circuit A connects the EC element to the resistor R1. On the other hand, during the non-application period in which no voltage is applied to the EC element, the drive circuit A connects the EC element to the resistor R2.

The drive circuit B (drive unit B) has the same mechanism as that of the drive circuit A, but during an erasing period in which the voltage of the drive power supply is not applied (non-application period of the voltage), sets the voltage between the electrodes of the EC element to 0 V. In short, the drive circuit B short-circuits the pair of electrodes. This is realized by setting electric potentials of the electrodes to the same electric potential by connecting each of the electrodes to an earth, a ground, or the like. As another example, a short circuit is realized by inserting a low-resistance resistor of 1Ω or less between the electrodes.

The drive circuit A and the drive circuit B are different from each other in terms of operation to be performed during the non-application period of the voltage in which the drive voltage is not applied, and are identical to each other in other points.

The controller 10 has a characteristic table associating a duty ratio with an absorbance to be reached with the duty ratio. In normal drive, the controller 10 selects a duty ratio required for the absorbance to reach a target absorbance. When the one cycle of the control signal is long, increase or decrease in absorbance change may be viewable, and hence an upper limit of the one cycle is at least 100 milliseconds or shorter, preferably 10 milliseconds or shorter. Further, a lower limit of the one cycle is determined so that the lower limit falls within such a range as to enable the electrochemical reaction to follow the cycle, and the lower limit is 1 microsecond or longer, preferably 10 microseconds or longer. It is preferred that the one cycle be fixed, but a certain deviation within the above-mentioned range may be tolerated. The controller 10 sends a switch signal to each of the drive circuit A and the drive circuit B, and for the drive circuit A, controls switching between the application period and the halt period, and for the drive circuit B, controls switching between the application period and the erasing period. Further, the controller 10 has the transient response time corresponding to the drive voltage application to the EC element as information in advance, and determines which of the drive circuit A and the drive circuit B is to be used based on a relationship between a ratio of the application period to one cycle of the pulse and the transient response time. Specifically, when the voltage application period is the transient response time or longer, the controller 10 uses the drive circuit A. On the other hand, when the voltage application period is shorter than the transient response time, the controller 10 uses the drive circuit B.

The EC element of the present invention may include a determination unit configured to determine which of the drive circuit A and the drive circuit B the EC element is to be connected to. In both of the cases where the drive circuit A is used and the drive circuit B is used, it is preferred that the voltage application period be longer than time of the transient response of the element.

Figure 3:
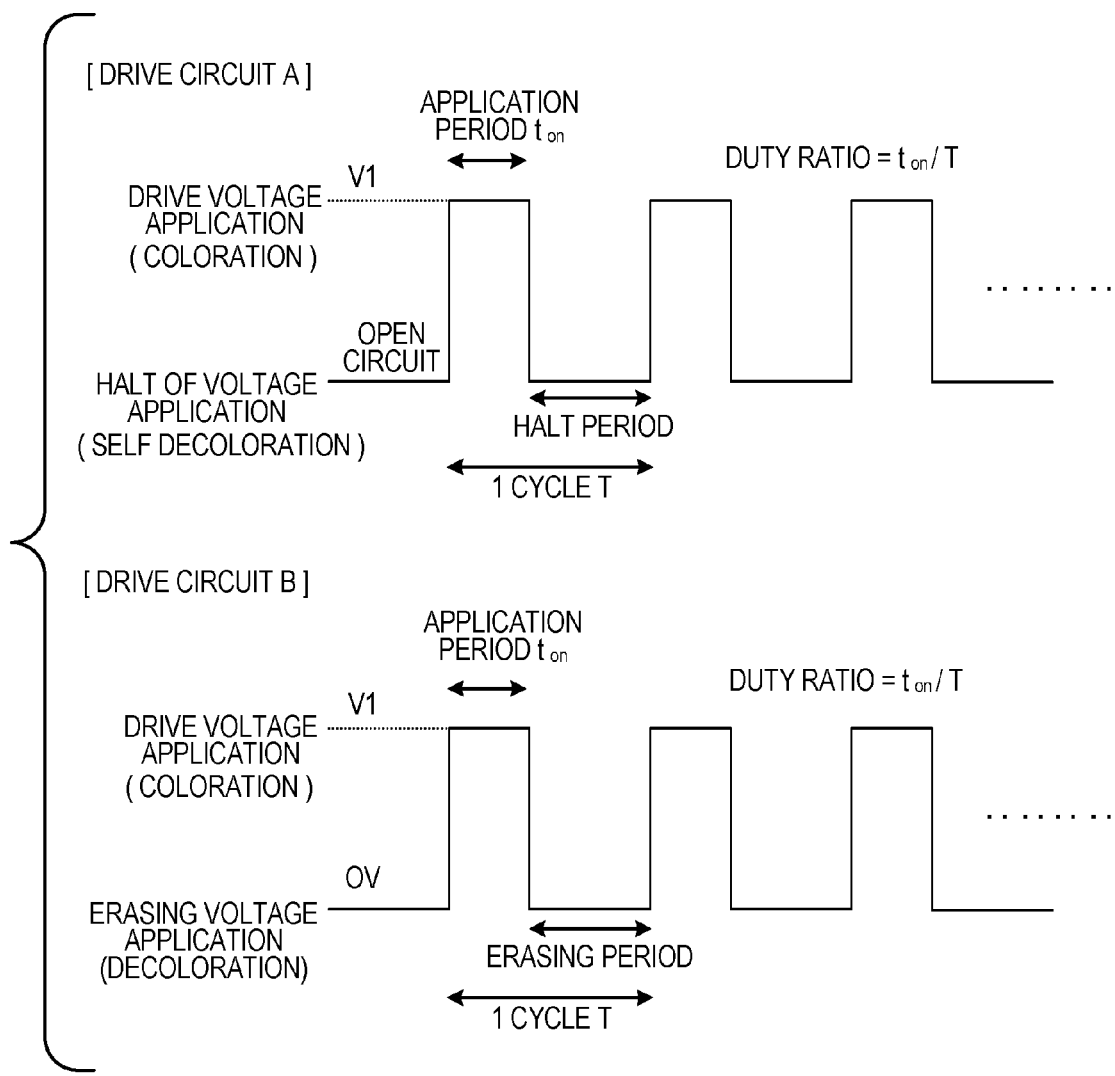
FIG. 3 is a diagram for illustrating an example of a drive control mode of the drive apparatus for an EC element according to the present invention.

FIG. 3 is a diagram for illustrating a method of applying a voltage to the EC element according to the present invention. In FIG. 3, from a starting point of drive, the drive power supply 8 applies, to the EC element, the constant voltage V1 for causing an electrochemical reaction of the EC material. In the drive circuit A, when receiving the signal from the controller 10, the resistor switch switches the low-resistance resistor and the high-resistance resistor from one to another, and connects the selected one of the resistors to the closed circuit including the EC element and the drive power supply. When the resistor switch switches a state of wiring connection between a connected state and a disconnected state, the circuit state is switched between the closed circuit state and the open circuit state based on the operation of the resistor switch as illustrated in the figure. The closed circuit state is a voltage applied state, and the open circuit state is a state in which the high-resistance resistor is inserted in series with the power supply (this state is hereinafter referred to as "stopped state"). In the voltage applied state, the EC element exhibits a coloring reaction. In the stopped state, the EC element exhibits a "self-decoloring phenomenon", in which the colored material is decolored. The self-decoloring phenomenon is caused by, for example, instability of the cation or anion of the EC material generated by the electrochemical reaction, or diffusion of the cation or the anion to a counter electrode having a different potential. When a certain duty ratio is given, the absorbance changes until a balance is reached between a colored amount and a self-decoloring amount, and then the balanced absorbance is maintained. The magnitude of the absorbance can be controlled through the application and stop of such a pulse drive of the drive voltage V1, namely, through an intermittent drive of the drive voltage V1, because the EC element has the self-decoloring phenomenon. Accordingly, it follows that the above-mentioned drive method is a method suitable for the EC element.

Note that, the drive voltage V1 is supplied during both of the application period and the halt period without changing its value. The switching between the voltage application and the stop of voltage application is controlled by the controller 10, and the controller 10 sends, to the resistor switch, the continuous pulse having the one cycle (period T) corresponding to a sum of a voltage application period $t_{on}$ and a halt period $t_{off}$.

Now, the ratio of the voltage application period $t_{on}$ to the one cycle is defined as the duty ratio. When the EC element is driven at a fixed duty ratio under the constant voltage of the drive power supply, a change in absorbance is saturated after passing through the transitional state, and then the saturated absorbance is maintained. In order to decrease the absorbance, it is only necessary that the duty ratio be fixed to the one smaller than the last duty ratio. Further, in order to increase the absorbance, it is only necessary that the duty ratio be fixed to the one larger than the last duty ratio.

Further, in the drive circuit B of FIG. 3, during the erasing period, for example, both of the electrodes of the EC element are connected to the ground to keep the voltage between the electrodes at 0 V. Under the voltage application state, when the EC element exhibits an oxidation reaction or a reduction reaction to exhibit a coloring reaction, during the erasing period in which the voltage is set to 0 V, a decoloration reaction occurs in the EC element in which an oxidant is re-reduced or a reductant is re-oxidized. This is different from the self-decoloring phenomenon in that the electrochemical reaction is caused actively, and even for the same time period, the decoloration reaction amount is larger than in the self-decoloring phenomenon. In addition, in the coloration reaction, a reaction amount is determined based on diffusion in which the material contained in the solvent reaches the electrodes, whereas the decoloration reaction has a reaction speed relatively higher than that of the coloration reaction because a colored reactant already exists near the electrodes. When a certain duty ratio is given, the absorbance changes until a balance is reached between a colored amount and a decolored amount, and then the balanced absorbance is maintained. The decolored amount is larger in the drive circuit B, and hence the duty ratio to obtain the same absorbance needs to be set larger than that of the drive circuit A.

Figure 4A:
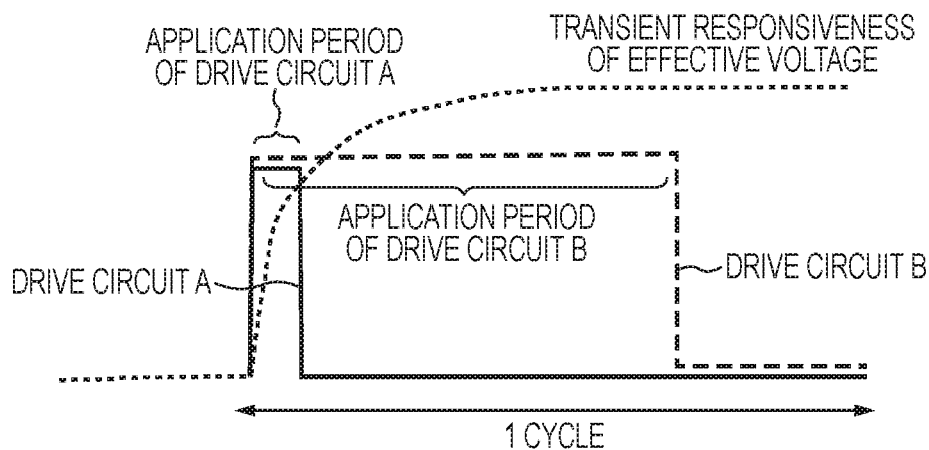
FIGS. 4A and 4B are schematic diagrams for illustrating relationships between the drive apparatus for an EC element and transient responsiveness of an effective voltage of an organic EC element according to the present invention.
Figure 4B:
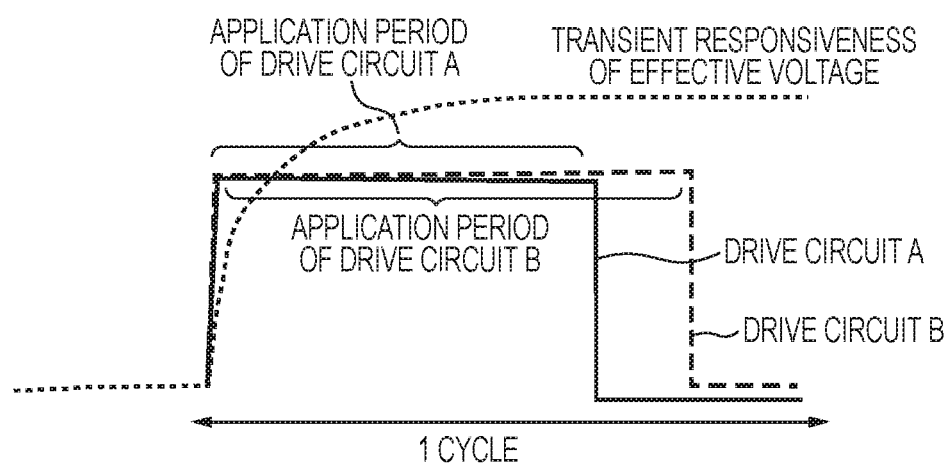

FIGS. 4A and 4B are diagrams for illustrating relationships between one cycle of the pulse of the drive circuit A and the drive circuit B of the EC apparatus of the present invention and the transient responsiveness of a voltage between the electrodes of the EC element (effective voltage).

As illustrated in FIG. 4A, when the colored amount from the initial state is controlled to be small, in the drive circuit A, a ratio of the application period to one cycle of the pulse needs to be set small because the self-decoloring amount is significantly smaller than the colored amount. In this case, the application period may be shorter than the transient response time of the effective voltage caused by capacitive property of the organic EC element, and hence the effective voltage is disadvantageously smaller than the drive voltage. On the other hand, in the drive circuit B, in the colored amount and the decolored amount included in one cycle of the pulse, in the coloration reaction, a reaction amount is determined based on diffusion in which the material contained in the solvent reaches the electrodes, whereas the decoloration reaction has a reaction speed relatively higher than that of the coloration reaction because a colored reactant already exists near the electrodes. Thus, even in the control for obtaining the same optical transmittance, the duty ratio is significantly larger than that of the drive circuit A. Therefore, in the drive circuit B, as compared with at least the drive circuit A, the application period is longer than the transient response time of the effective voltage, or can cover the region of the transient response time over a wider range, and hence the effective voltage becomes closer to the drive voltage.

On the other hand, as illustrated in FIG. 4B, when the colored amount from the initial state is controlled to be large, a difference between the application period of the drive circuit A and the application period of the drive circuit B is relatively small, and hence even in the drive circuit A, the effective voltage becomes closer to the drive voltage. In the drive circuit B, the decoloration reaction is actively caused, and hence its power consumption is larger than that of the drive circuit A. Therefore, it is preferred to use the drive circuit A in such a case.

As described above, based on a relationship between the ratio of the application period of the drive voltage to one cycle of the pulse of the PWM drive and the transient response time of the effective voltage of the organic EC element, the drive circuit A or the drive circuit B is chosen. In the case where the element is maintained at the same absorbance using the drive circuit A or the drive circuit B, when the application period of the drive circuit A is shorter than the transient response time, it is preferred to use the drive circuit B. On the other hand, when the application period of the drive circuit A is the transient response time or longer, it is preferred to use the drive circuit A. More specifically, the transient response time is time to take before saturation of the effective voltage of the element arrives at 90%, more preferably, arrives at 95%. When the absorbance of the element to maintain is small, the applying period of the drive circuit A becomes small than the response time of the effective voltage of the element normally. Therefore, when the absorbance is small, the drive circuit B is used, and when the absorbance is large enough, the drive circuit A is used. In addition, the change of the drive circuit A or B may be judged appropriately by the transient response time or the absorbance or the spectrum of the element.

According to the drive apparatus of the present invention, the PWM drive can be performed in which the transient responsiveness of the effective voltage applied between the electrodes of the element is taken into consideration, and hence it is possible to suppress a change of the effective voltage. In addition, it is possible to suppress a change of the absorption spectrum due to a difference among a plurality of materials. As described above, it is possible to provide the drive apparatus for an electrochromic element, the method of driving the same, the optical filter, the imaging apparatus, the lens unit, and the window member that are excellent in control of optical transmittance and wavelength selectivity.

<<Optical Filter>>

An optical filter of the present invention includes the above-mentioned EC apparatus of the present invention and an active element connected to the EC apparatus. The active element is an element configured to control an amount of light transmitted through the EC apparatus. Specific examples of the active element include a transistor and a metal-insulator material (MIM) element. For example, the EC apparatus illustrated in FIG. 1 may be applied as the optical filter. The optical filter may be used in an imaging apparatus such as a camera. When used in the imaging apparatus, the optical filter may be provided in a main body of the imaging apparatus, or may be provided in a lens unit. Now, a case is described where a neutral density (ND) filter is formed as the optical filter.

The neutral density filter absorbs black, and preferably absorbs light uniformly in a visible light region. In order to realize the black absorption with the use of the organic EC material, it is only necessary that a plurality of materials having different absorption regions in the visible light region be mixed to make absorption flat in the visible light region. The absorption spectrum in the case of mixing the organic EC materials is expressed by a sum of the absorption spectra of the respective materials, and hence the black absorption can be realized by selecting a plurality of materials having appropriate wavelength regions and adjusting concentrations thereof.

An example of driving the neutral density (ND) filter according to the present invention is described below. In general, the neutral density (ND) filter reduces an amount of light to $\frac{1}{2^n}$ (where n is an integer). When the amount of light is reduced to ½, the transmittance is reduced from 100% to 50%. When the amount of light is reduced to ¼, the transmittance is reduced from 100% to 25%. Further, when the transmittance is reduced to ½, from a relationship of $-\log(\text{transmittance})=(\text{absorbance})$, the absorbance change amount is 0.3, and when the transmittance is reduced to ¼, the absorbance change amount is 0.6. In order to reduce the light amount so that the transmittance varies from ½ to ¹⁄₆₄, it is only necessary that the absorbance change amount be controlled to be from 0 to 1.8 in units of 0.3.

When the EC layer is in a solution state, the absorbance change amount includes a change amount of the colored amount that is caused by a fluctuation of the solution. In order to achieve accurate control, the optical filter may be equipped with an external monitor configured to measure a light amount as a part of the optical filter.

<<Imaging Apparatus and Lens Unit>>

An imaging apparatus according to the present invention includes the above-mentioned optical filter according to the present invention and a light receiving element configured to receive light that has been transmitted through the optical filter.

Further, a lens unit according to the present invention includes the above-mentioned optical filter according to the present invention and an optical system including a plurality of lenses. The optical filter may be disposed so that the light that has been transmitted through the optical filter is then transmitted through the optical system. Alternatively, the optical filter may be disposed so that the light that has been transmitted through the optical system is then transmitted through the optical filter.

Figure 5:
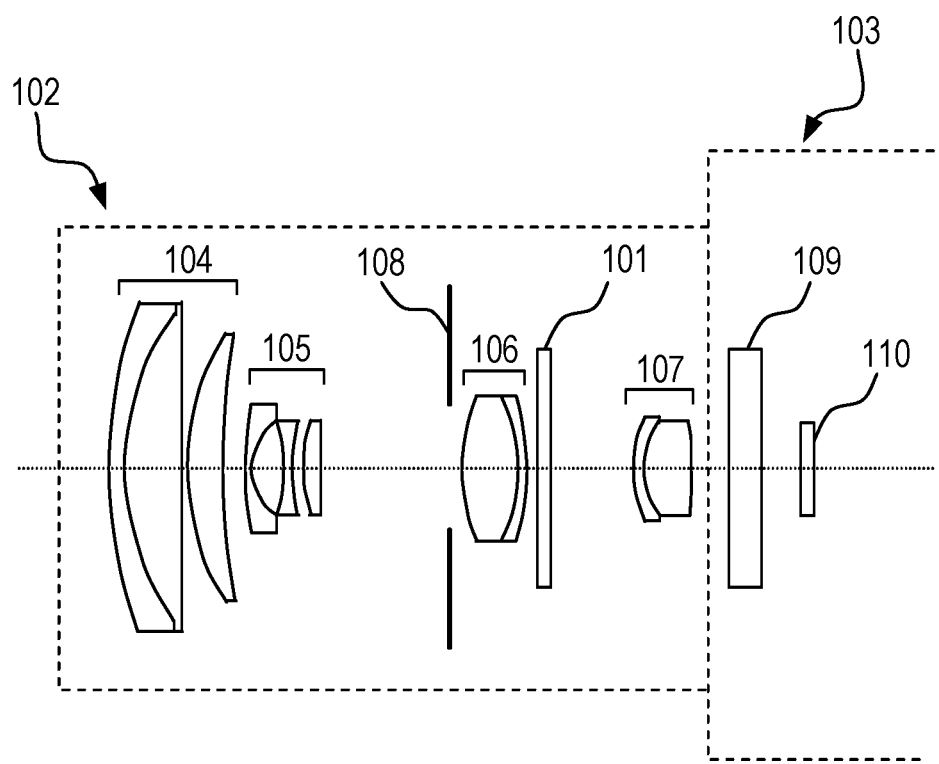
FIG. 5 is a diagram for illustrating an example of an imaging apparatus according to the present invention.

FIG. 5 is a schematic diagram for illustrating the imaging apparatus including the lens unit using the optical filter according to the present invention. As illustrated in FIG. 5, a lens unit 102 is removably connected to an imaging through a mount member (not shown).

The lens unit 102 is a unit including a plurality of lenses or lens groups. For example, the lens unit 102 illustrated in FIG. 5 is a rear-focus zoom lens configured to perform focusing behind a diaphragm. The lens unit 102 includes, in order from a subject side (left side of the drawing), four lens groups of a first lens group 104 having a positive refractive power, a second lens group 105 having a negative refractive power, a third lens group 106 having a positive refractive power, and a fourth lens group 107 having a positive refractive power. An interval between the second lens group 105 and the third lens group 106 is changed to vary magnification, and a part of lenses of the fourth lens group 107 is moved to perform focusing. For example, the lens unit 102 includes a diaphragm 108 disposed between the second lens group 105 and the third lens group 106, and further includes an optical filter 101 disposed between the third lens group 106 and the fourth lens group 107. Those components are disposed so that the light to be transmitted through the lens unit 102 is transmitted through the lens groups 104 to 107, the diaphragm 108, and the optical filter 101, and the amount of light can be adjusted with the use of the diaphragm 108 and the optical filter 101.

Further, a configuration of the components of the lens unit 102 can be modified appropriately. For example, the optical filter 101 may be disposed in front of the diaphragm 108 (on the subject side thereof), or may be disposed behind the diaphragm 108 (on the imaging apparatus 103 side thereof). Alternatively, the optical filter 101 may be disposed in front of the first lens group 104, or may be disposed behind the fourth lens group 107. When the optical filter 101 is disposed at a position where light converges, there is an advantage in that an area of the optical filter 101 can be reduced, for example. Further, a mode of the lens unit 102 can also be selected appropriately. Instead of the rear-focus zoom lens, the lens unit 102 may also be an inner-focus zoom lens configured to perform focusing in front of the diaphragm, or may be another type of zoom lens configured to perform focusing in another way. Further, instead of the zoom lens, a special-purpose lens such as a fisheye lens or a macro lens can also be selected appropriately.

A glass block 109 of the imaging apparatus is a glass block such as a low-pass filter, a face plate, or a color filter. Further, a light receiving element 110 is a sensor unit configured to receive light that has been transmitted through the lens unit 102, and an imaging element such as a CCD or a CMOS may be used as the light receiving element 110. Further, the light receiving element 110 may also be an optical sensor such as a photodiode, and a device configured to acquire and output information on intensity or wavelength of light can be used appropriately as the light receiving element 110.

When the optical filter 101 is built into the lens unit 102 as illustrated in FIG. 5, the drive apparatus may be disposed within the lens unit 102, or may be disposed outside the lens unit 102. When the drive apparatus is disposed outside the lens unit 102, the EC element and the drive apparatus, which are respectively disposed within and outside the lens unit 102, are connected to each other through wiring, and the drive apparatus drives and controls the EC element.

Figure 6:
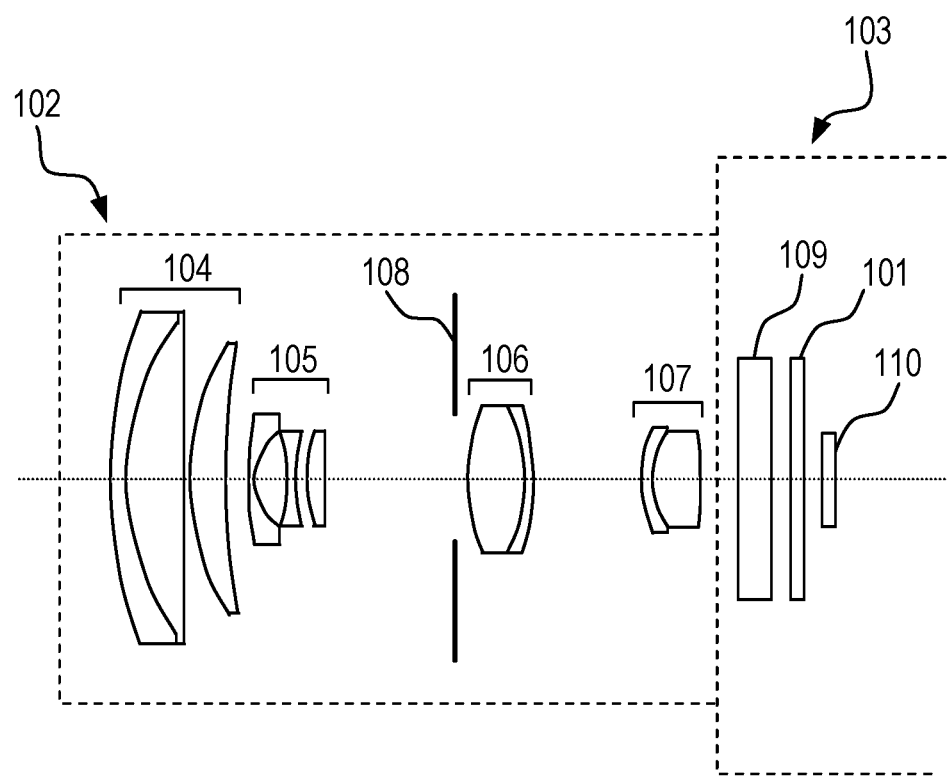
FIG. 6 is a diagram for illustrating another example of the imaging apparatus according to the present invention.

As illustrated in FIG. 6, the imaging apparatus 103 itself may include the optical filter 101 according to the present invention. FIG. 6 is a schematic diagram of the imaging apparatus including the optical filter. The optical filter 101 is disposed at an appropriate position within the imaging apparatus 103, and it is only necessary that the light receiving element 110 be disposed so as to receive the light that has been transmitted through the optical filter 101. In FIG. 6, for example, the optical filter 101 is disposed immediately in front of the light receiving element 110. When the imaging apparatus 103 itself has the optical filter 101 built therein, the lens unit 102 itself connected to the imaging apparatus 103 does not need to include the optical filter 101, and hence it is possible to form the imaging apparatus using an existing lens unit and being capable of controlling light.

The imaging apparatus described above is applicable to a product having a combination of a function of adjusting a light amount and a light receiving element. The imaging apparatus can be used in, for example, a camera, a digital camera, a camcorder, or a digital camcorder. The imaging apparatus is also applicable to a product having the imaging apparatus built therein, such as a mobile phone, a smartphone, a PC, or a tablet computer.

Through the use of the optical filter according to the present invention as a light control member, it is possible to appropriately vary a light amount to be controlled with the use of one filter, and there is an advantage in that the number of members can be reduced and that a space can be saved, for example.

<<Window Member>>

Figure 7A:
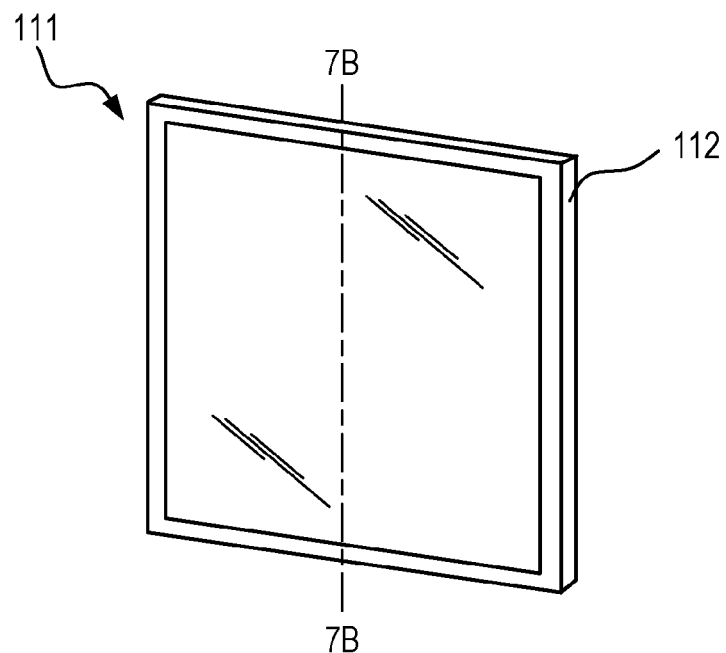
FIGS. 7A and 7B are views each for illustrating an example of a window member according to the present invention.
Figure 7B:
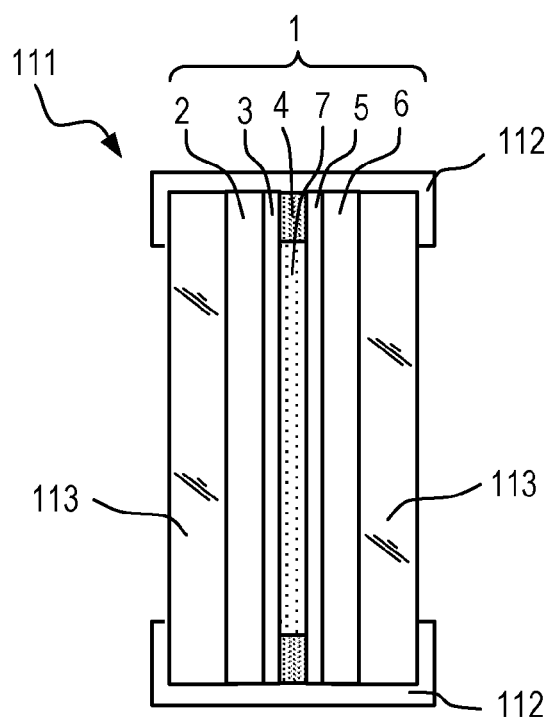

A window member according to the present invention includes an EC element and the above-mentioned apparatus for driving the EC element according to the present invention. FIGS. 7A and 7B are views each for illustrating the window member according to the present invention. FIG. 7A is a perspective view of the window member, and FIG. 7B is a cross-sectional view taken along the line 7B-7B of FIG. 7A.

The window member 111 of FIGS. 7A and 7B is a light control window, and includes the EC element 1, transparent plates 113 for sandwiching the EC element 1 therebetween, and a frame 112 for surrounding the entire window member to integrate those components into one window member. The drive apparatus may be built into the frame 112, or may be disposed outside the frame 112 and connected to the EC element 1 through wiring.

The transparent plates 113 are not particularly limited as long as being made of a material having a high optical transmittance. Considering the use of the window member 111 as a window, it is preferred that the transparent plates 113 be made of glass materials. In FIGS. 7A and 7B, the EC element 1 is a constituent member independent of the transparent plates 113, but for example, the substrates 2 and 6 of the EC element 1 may be regarded as the transparent plates 113.

A material property of the frame 112 is not limited, but any member that covers at least a part of the EC element 1 and has a form of being integrated into one frame may be regarded as the frame.

The light control window described above is applicable to, for example, use of adjusting an amount of sunlight entering a room during the daytime. The light control window can be used to adjust not only the amount of sunlight but also a heat quantity, and hence can be used to control brightness and temperature of the room. Further, the light control window is also applicable to use as a shutter to prevent an indoor view from being seen from the outside of the room. The light control window described above is applicable not only to a glass window for a construction, but also to a window of a vehicle such as an automobile, a train, an airplane, or a ship, and to a filter of a display surface of a clock, a watch, or a mobile phone.

Example 1

In Example 1, the drive apparatus illustrated in FIG. 1 was produced by using as the organic EC material the compounds 1 to 3 and a compound 4 given below, which formed cations from neutral species through an oxidation reaction to be colored.

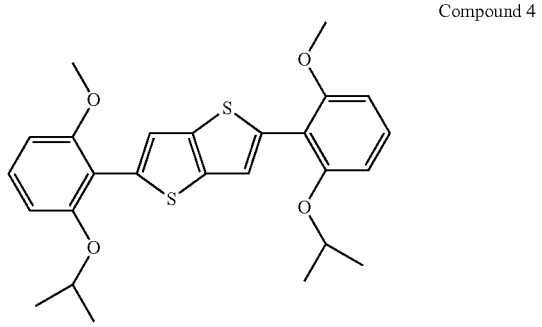 [SMILES: COc1cccc(OC(C)C)c1-c1cc2sc(-c3c(OC)cccc3OC(C)C)cc2s1]

Compound 4

The oxidation potentials of the compounds 1 to 4 are as follows: compound 1: 394 mV; compound 2: 441 mV; compound 3: 345 mV; and compound 4: 311 mV. When plural materials are mixed, if anodic electric potentials are different, it is easy to be affected by the effective voltage of the element. In Example 1, the gap of the anodic electric potential of the plural materials was up to 130 mV. In addition, as for any combination of two materials, the element is affected by the effective voltage. The minimum of the gap of the anodic electric potential in 2 materials was 34 mV.

The EC element 1 has a construction as illustrated in FIG. 2. Two glass FTO substrates (substrates in which the electrodes 3 and 5 each formed of a fluorine-doped tin oxide thin film are formed on the substrates 2 and 6 each made of glass) are bonded to each other through the spacer 4 of 125 µm. The EC layer 7 is present in a space formed by the substrates 2 and 6 and the spacer 4. As the EC layer 7, a solution obtained by dissolving the compounds 1 to 4 in a propylene carbonate solvent together with a supporting electrolyte (TBAP) is injected. The concentrations of the compounds 1 to 4 and TBAP are each 13 mM, 30 mM, 8 mM, 2 M, and 0.1 M. When a voltage of 1.8 V is applied between the electrodes as the drive voltage V1, the compounds 1 to 4 are oxidized by the electrode on one side (anode) to be colored.

Figure 8A:
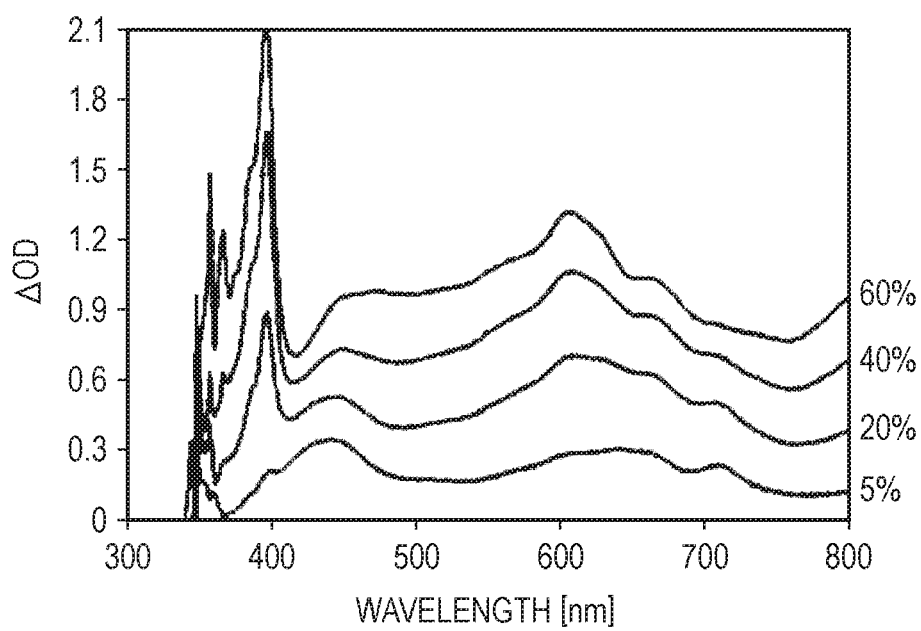
FIGS. 8A and 8B are graphs for showing an absorption spectrum obtained when an EC element according to Example 1 of the present invention was driven by a drive circuit A, and for showing an effective voltage obtained at this time, respectively.
Figure 8B:
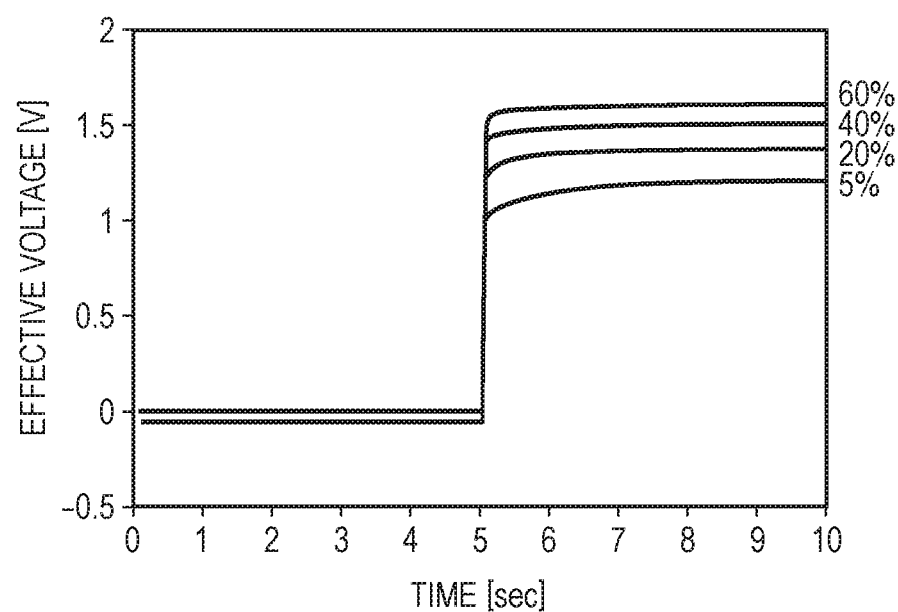

FIGS. 8A and 8B are graphs for showing a change of the absorbance obtained when the organic EC element using the compounds 1 to 4 was driven with the use of the drive circuit A at a fixed duty ratio in the coloring direction while assuming the initial state in which the EC element is decolored as a starting point, and for showing an effective voltage of the element observed at this time, respectively.

The drive power supply applies a constant voltage that causes an electrochemical reaction. Connection between the organic EC element and the drive power supply is controlled by a switch circuit (relay circuit) serving as the resistor switch, and the switch circuit switches the state of wiring connection between the drive power supply and the EC element between the connected state and the disconnected state. Timing for controlling the switch circuit was controlled based on voltage supply from an arbitrary waveform generator. Further, the drive pulse has a frequency of 100 Hz. The arbitrary waveform generator can be considered as corresponding to a part of functions of the controller. The operation of the switch circuit is the same as connecting one of the low-resistance resistor and the high-resistance resistor to wiring of the organic EC element in series. In this case, the low-resistance resistor can be regarded as a resistor of a wiring material, and has a resistance value of 10Ω or smaller. Further, the high-resistance resistor is the air, and hence its resistance value far exceeds 1 MΩ.

An amount of current flowing through the circuit is controlled by switching the resistor to be connected to the element circuit between the low-resistance resistor and the high-resistance resistor in this manner. When the element circuit is connected to the low-resistance resistor, the current flows to cause the oxidation reaction. As a result, the organic EC element is colored. When the element circuit is connected to the high-resistance resistor, no current flows, and hence the oxidation reaction is not caused. At this time, the organic EC element exhibits the self-decoloring phenomenon due to diffusion. Until the balance is reached between the oxidation reaction amount and the self-decoloring amount, the absorbance changes transiently, and after the balance is reached, the balanced absorbance is maintained.

The change of absorbance was measured with the use of a spectrometer (manufactured by Ocean Optics, Inc., USB2000+) capable of measuring absorption in ultraviolet, visible, and near infrared wavelength regions.

When the application of the drive voltage and the control at the fixed duty ratio were performed at the same time on the EC element while assuming the state in which the EC element is not colored as the initial state, the EC element changed its magnitude of the absorbance to be reached depending on the magnitude of the duty ratio. It can be understood from FIG. 8A that a waveform of the absorption spectrum at the duty ratio of 5% is significantly different from waveforms of the absorption spectrum at the duty ratios of 20% or larger in terms of a relative intensity at a peak and the like.

FIG. 8B is a graph for showing a change with time of the effective voltage of the organic EC element at the respective duty ratios. It can be understood from FIG. 8B that the effective voltage becomes larger as the duty ratio becomes larger. A change of the absorption spectrum is caused by the fact that a change of the effective voltage affected a subtle variation in reduction potential among the materials to change reacting amount ratios of the respective materials.

Figure 9:
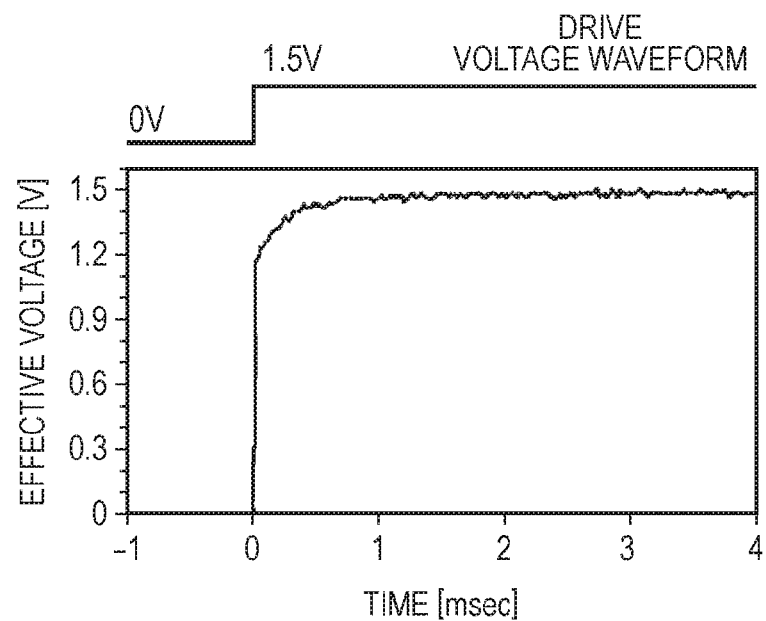
FIG. 9 is a graph for showing transient responsiveness of the effective voltage of the EC element according to Example 1.

FIG. 9 is a graph for showing rising of the effective voltage of the organic EC element obtained when the drive voltage of 1.5 V was applied to the element, and the transient responsiveness is shown in FIG. 9. In FIG. 9, the transient response time caused by the capacitive property of the organic EC element was about 1 msec. The drive pulse has a frequency of 100 Hz (length of 10 msec), and hence when the duty ratio is 10% or smaller, the application period is shorter than the transient response time of the effective voltage of the organic EC element. Even when the duty ratio is 10% or larger, the effective voltage did not rise sufficiently to 1.8 V corresponding to the drive voltage, but the absorption spectrum waveforms are more similar to one another, and hence it can be understood that a necessary condition is that the transient response time is longer than the application period.

It can be thus understood that in order to control the magnitude of the optical transmittance by the drive circuit A under a state in which the shape of the absorption spectrum is substantially maintained, it suffices if the application period is set to be larger than time of the transient responsiveness of the effective voltage.

Figure 10:
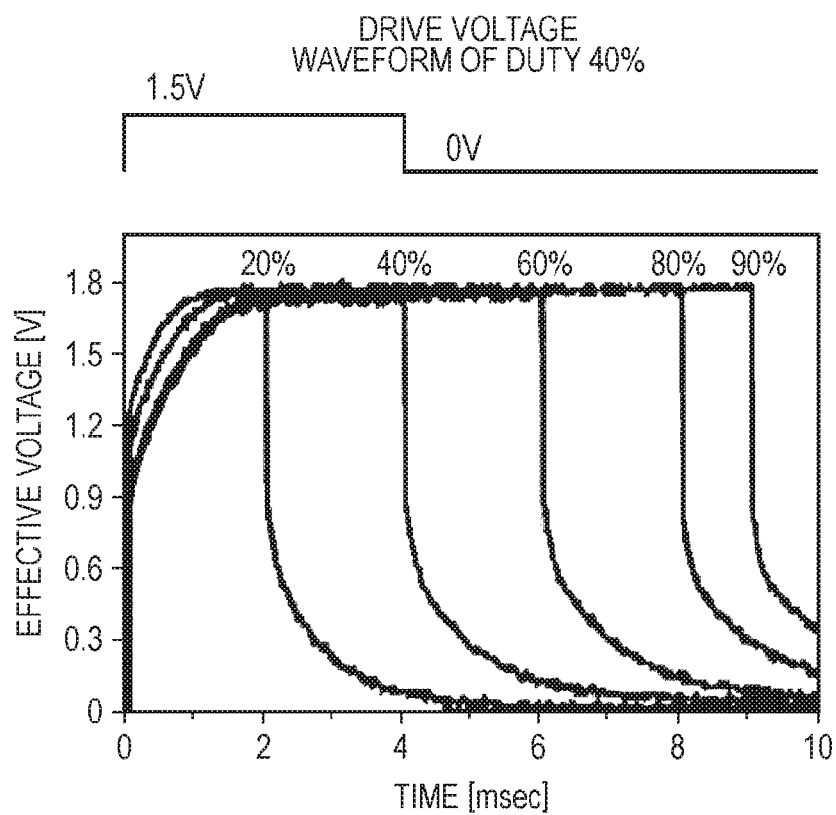
FIG. 10 is a graph for showing a relationship between a duty ratio and an effective voltage obtained when the EC element according to Example 1 was driven by a drive circuit B.

Further, FIG. 10 is a graph for showing a change of the effective voltage of the element at each of the duty ratios obtained when the drive voltage of 1.8 V was applied to the organic EC element with the use of the drive circuit B. An element different from that of FIGS. 8A and 8B and FIG. 9 was used in this case, and hence the transient response time of the effective voltage was about 2 msec. The drive pulse has a frequency of 100 Hz (length of 10 msec), and hence when the duty ratio is 20% or smaller, the application period is shorter than the transient response time of the effective voltage of the organic EC element. Note that, in the drive circuit B, in the colored amount and the decolored amount included in one cycle of the pulse, in the coloration reaction, a reaction amount is determined based on diffusion in which the material contained in the solvent reaches the electrodes, whereas the decoloration reaction has a reaction speed relatively higher than that of the coloration reaction because a colored reactant already exists near the electrodes. Thus, even in the control for obtaining the same optical transmittance, the duty ratio is significantly larger than that of the drive circuit A. A duty ratio required for the drive circuit B to obtain the absorbance that was obtained by the drive circuit A at the duty ratio of 5% in FIGS. 8A and 8B was about 80%. The application period at this time was significantly larger than the transient response time of the effective voltage, and hence a change of the waveform of the absorption spectrum caused by a low effective voltage can be suppressed.

At the same time, the decoloration reaction is actively caused in the drive circuit B, and hence there is a problem in that its power consumption is larger than that of the drive circuit A. Therefore, referring to a relationship between the application period and the transient response time of the effective voltage, when the application period is shorter than the transient response time, it is desired to use the drive circuit B. On the other hand, when the application period is the transient response time or longer, it is desired to switch the drive circuit B to the drive circuit A for use. This way, when electric potential between materials are different, the element is easy to be affected by the effective voltage. In the case where the element is maintained at the same absorbance using the drive circuit A or the drive circuit B, when the application period of the drive circuit A is shorter than the transient response time, it is preferred to use the drive circuit B. On the other hand, when the application period of the drive circuit A is the transient response time or longer, it is preferred to use the drive circuit A. More specifically, the transient response time is time to take before saturation of the effective voltage of the element arrives at 90%, more preferably, arrives at 95%. When the absorbance of the element to maintain is small, the applying period of the drive circuit A becomes smaller than the response time of the effective voltage of the element normally. Therefore, when the absorbance is small, the drive circuit B is used, and when the absorbance is large enough, the drive circuit A is used. In addition, the change of the drive circuit A or B may be judged appropriately by the transient response time or the absorbance or the spectrum of the element.

The electrochromic element according to the present invention is capable of reducing time spent for the transitional state in which the optical transmittance changes and is excellent in operating performance, and can thus be used for various optical filters, in particular, a neutral density (ND) filter for a camera.

According to the present invention, the PWM drive can be performed in which the transient responsiveness of the effective voltage applied between the electrodes of the element is taken into consideration, and hence it is possible to suppress a change of the effective voltage.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-050475, filed Mar. 13, 2015, which is hereby incorporated by reference herein in its entirety.

What is claimed is:

1. An electrochromic apparatus, comprising:
an electrochromic element comprising a pair of electrodes and an electrochromic layer disposed between the pair of electrodes; and
drive circuits connected to the electrochromic element, the drive circuits comprising a drive circuit A and a drive circuit B,
wherein, when no voltage is applied in a pulse width modulation (PWM) drive of the drive circuit A, a resistance value of the drive circuit A is larger than a resistance value of the electrochromic element, and
wherein, when no voltage is applied in a PWM drive of the drive circuit B, the pair of electrodes is short-circuited.

2. The electrochromic apparatus according to claim 1, wherein, when no voltage is applied in the PWM drive of the drive circuit A, the drive circuit A is an open circuit.

3. The electrochromic apparatus according to claim 1, further comprising a determination unit configured to determine which of the drive circuit A and the drive circuit B is to be used.

4. The electrochromic apparatus according to claim 1, wherein, when tA is less than ts×0.9, the drive circuit B is to be used, and when tA is equal to or larger than ts×0.9, the drive circuit A is to be used,
where tA is the voltage applying period of the drive circuit A to maintain a certain absorbance, and ts is a response time before the effective voltage of the element being saturated.

5. The electrochromic apparatus according to claim 1, wherein the drive circuit B is used when a visible light transmittance of the electrochromic element is to be set low.

6. The electrochromic apparatus according to claim 1, wherein an electrochromic element has at least one side of plural anodic materials and plural cathodic materials,
where the largest difference of the anodic electrical potential of the plural anodic materials or the cathodic electrical potential of the plural cathodic materials is more than 20 mV.

7. An optical filter, comprising:
the electrochromic apparatus according to claim 1; and
an active element connected to the electrochromic apparatus.

8. An imaging apparatus, comprising:
the electrochromic apparatus according to claim 1; and
a light receiving element configured to receive light that has been transmitted through an optical filter.

9. A lens unit, comprising:
an optical system comprising a plurality of lenses; and
the electrochromic apparatus according to claim 1.

10. A window member, comprising the electrochromic apparatus according to claim 1.

11. A method of driving an electrochromic apparatus, the electrochromic apparatus comprising:
an electrochromic element comprising a pair of electrodes and an electrochromic layer disposed between the pair of electrodes; and
drive units connected to the electrochromic element,
the drive units comprising a drive unit A and a drive unit B,
the method comprising using one of the drive unit A and the drive unit B,
the drive unit A comprising a unit configured to connect, when no voltage is applied in a pulse width modulation (PWM) drive of the drive unit A, the electrochromic element to a resistor having a resistance value larger than a resistance value of the electrochromic element, and
the drive unit B comprising a unit configured to short-circuit the pair of electrodes when no voltage is applied in a PWM drive of the drive unit B.

12. The method of driving an electrochromic apparatus according to claim 11, wherein the drive unit A comprises a unit configured to switch a drive circuit to an open circuit when no voltage is applied in the PWM drive of the drive unit A.

13. The method of driving an electrochromic apparatus according to claim 11, wherein the drive unit B is used when transmittance of the electrochromic element is to be set low.

* * * * *